(12) United States Patent
Ruehle-May (10) Patent No.: US 12,297,546 B1
(45) Date of Patent: May 13, 2025

(54) TURBINE-INDUCED ICCP SYSTEM FOR METALLIC PIPELINES

(71) Applicant: Isaiah Ruehle-May, Oak Park, IL (US)

(72) Inventor: Isaiah Ruehle-May, Oak Park, IL (US)

(*) Notice: Subject to any disclaimer, the term of this patent is extended or adjusted under 35 U.S.C. 154(b) by 0 days.

(21) Appl. No.: 18/912,286

(22) Filed: Oct. 10, 2024

(51) Int. Cl.
| | |
|---|---|
| *C23F 13/06* | (2006.01) |
| *F03B 13/08* | (2006.01) |
| *H02K 7/116* | (2006.01) |
| *H02K 7/18* | (2006.01) |

(52) U.S. Cl.
CPC .............. *C23F 13/06* (2013.01); *F03B 13/08* (2013.01); *H02K 7/116* (2013.01); *H02K 7/1823* (2013.01)

(58) Field of Classification Search
CPC ......... C23F 13/06; F03B 13/08; H02K 7/116; H02K 7/1823
See application file for complete search history.

(56) References Cited

U.S. PATENT DOCUMENTS

| | | | |
|---|---|---|---|
| 3,081,251 A | 3/1963 | Spector | |
| 4,007,906 A * | 2/1977 | Karpenko | F16B 37/043 251/30.02 |
| 4,392,063 A * | 7/1983 | Lindquist | F03B 11/02 415/118 |
| 4,891,115 A | 1/1990 | Shishkin et al. | |
| 5,251,815 A * | 10/1993 | Foye | F24F 13/06 236/51 |
| 5,364,304 A * | 11/1994 | Hampton | F24F 3/044 454/258 |
| 7,579,703 B2 * | 8/2009 | Shifrin | F03B 13/105 290/52 |
| 8,072,089 B2 * | 12/2011 | Krouse | F03B 17/061 290/43 |
| 8,156,801 B2 * | 4/2012 | Gabard-Cuoq | G01F 1/10 251/315.16 |
| 8,678,778 B2 * | 3/2014 | Bosbach | F16K 5/10 417/423.1 |
| 9,243,604 B2 * | 1/2016 | Montgomery | F03B 13/00 |
| 10,451,458 B2 * | 10/2019 | Artiuch | G01F 1/075 |
| 11,371,343 B2 * | 6/2022 | Greci | E21B 47/20 |
| 11,591,764 B2 * | 2/2023 | Van Delden | C23F 13/16 |
| 11,747,835 B2 * | 9/2023 | Ham | G05D 7/0635 137/561 R |
| 2009/0236852 A1 * | 9/2009 | Balzano | F03B 13/00 290/43 |
| 2013/0062881 A1 * | 3/2013 | Mellah | F03B 13/00 290/50 |
| 2014/0346776 A1 * | 11/2014 | Park | F01D 15/10 290/52 |
| 2022/0317709 A1 * | 10/2022 | Ham | F03B 17/06 |
| 2022/0408233 A1 | 12/2022 | Samuel et al. | |
| 2023/0287859 A1 * | 9/2023 | Malavasi | F16K 3/0281 |
| 2024/0183039 A1 | 6/2024 | Scotto | |

* cited by examiner

*Primary Examiner* — Craig M Schneider
*Assistant Examiner* — Christopher D Ballman
(74) *Attorney, Agent, or Firm* — My Patent Guys; Christopher Pilling; Colton Bangs (57) ABSTRACT

A turbine-induced Impressed Current Cathodic Protection (ICCP) system for metallic pipelines utilizes the kinetic energy of fluid flow within the pipeline to generate electrical power for corrosion protection. The system includes a turbine installed within a pipeline appurtenance, such as an air release valve, allowing operation without pipeline drainage or decompression. Rotating turbine blades convert fluid motion into direct current electrical power via a connected DC generator, powering the ICCP system.

12 Claims, 7 Drawing Sheets

TURBINE-INDUCED ICCP SYSTEM FOR METALLIC PIPELINES

CROSS-REFERENCE TO RELATED APPLICATIONS

N/A

BACKGROUND OF THE INVENTION

1. Field of the Invention

The present invention relates to corrosion protection of pipelines, but more particularly a turbine-induced Impressed Current Cathodic Protection (ICCP) system for metallic pipelines, such as steel pipelines.

2. Description of Related Art

Cathodic protection has been used for years to protect against the corrosion of metal surfaces in large structures that are exposed to various environments such as water or soil. It is widely applied in marine, infrastructure and oil and gas applications. The technique works by converting the entire metal surface into a cathode, which reduces its tendency to corrode.

There are two main systems for cathodic protection. In a galvanic system, a sacrificial anode of a more reactive metal is connected to the larger metal structure and will corrode in place of the larger structure. In an impressed current system, an external power source is used to provide current to the metal structure and make it the cathode of an electrochemical cell in combination with an inert anode placed near the structure. The current forces electrons onto the metal structure which prevents it from corroding.

Impressed Current Cathodic Protection (ICCP) systems are typically used for larger structures or structures that require a higher level of protection, such as large storage tanks or long pipelines. While the electric grid is often used as the power source for ICCP systems, this is not always feasible, particularly in remote locations. Solar power, wind power and batteries are used today as a power source in remote locations, however, these options have their own drawbacks such as cost, maintenance and reliability. Hence, there is a need in the field for an innovative approach to powering ICCP systems in certain applications such as remotely-located metallic pipelines.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

What is needed in the art and has heretofore not been described is a turbine-induced ICCP system for metallic pipelines, including but not limited to steel pipelines. The system uses a turbine suspended into the pipeline to harness the kinetic energy of the fluid in the pipeline and convert it to electrical current to power the ICCP system. The turbine is mounted within an appurtenance of the pipeline such as an air-release valve.

In order to do this, in one aspect of the invention, a turbine for powering an impressed current cathodic protection system for a pipeline is provided, comprising a plurality of turbine blades configured to extend into the pipeline and to rotate under the influence of fluid flow within the pipeline; a turbine blade bracket configured to support and receive the plurality of turbine blades, the turbine blade bracket extending through a pipeline appurtenance, allowing installation of the plurality of turbine blades without draining or decompressing the pipeline; an enclosure tube removably attached to the pipeline appurtenance, the enclosure tube fitting around the turbine blade bracket and facilitating installation and maintenance of the plurality of turbine blades; and a DC generator coupled to the plurality of turbine blades, configured to convert kinetic energy from the plurality of turbine blades into direct current electrical power sufficient to cathodically protect the pipeline.

In one embodiment, the turbine blades are sized to accommodate varying diameters of the pipeline. In one embodiment, the DC generator is capable of generating up to 15 kW of direct current electrical power. In one embodiment, a stepper diode configured to modulate the current output from the DC generator to a level that prevents embrittlement of the pipeline while providing adequate cathodic protection. In one embodiment, the enclosure tube includes a removable attachment element for connecting to the pipeline appurtenance, facilitating maintenance. In one embodiment, the pipeline appurtenance includes an air release valve and a ball valve, which allow installation of the turbine without requiring the pipeline to be drained or decompressed. In another embodiment, the turbine blade bracket extends away from the turbine blades and passes through a pipeline tee and a ball valve to provide access to the turbine is provided. In yet another embodiment, a reference coupon configured to measure the electronegativity of the soil surrounding the pipeline to determine the required voltage and current for cathodic protection is provided.

In one embodiment, the DC generator is located on the outside of the enclosure tube to enable easy replacement or repair of the DC generator. In one embodiment, the turbine blades each have a pin on their top-side and divot on their bottom-side, and the pin on a turbine blade fits into the divot on the turbine blade directly above it, and the pin-divot connection between the two turbine blades allows a certain angular distance of free movement between the two connected turbine blades. In one embodiment, the turbine blades can be extended into or retracted from the pipeline using a manual crank handle to manipulate the position of the main axle, and by extension, the position of the turbine blades. In another embodiment, a manual blade alignment axle and a manual retraction axle is provided, configured to align and retract the turbine blades for removal from the pipeline.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a turbine-induced ICCP system for metallic pipelines.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. The term "approximate" or "approximately," as used herein, shall refer to a range of values that are within [+/−10%] of a stated reference value. This range acknowledges the inherent variations found in manufacturing, measuring, and application processes, allowing for minor deviations that do not materially affect the novel functionality or utility of the invention. These terms generally refer to a range of numbers that one of skill in the art would consider equivalent to the recited values (i.e., having the same function or result). In many instances these terms may include numbers that are rounded to the nearest significant figure.

The invention connects to and provides electrical power to an ICCP system which comprises a protected structure such as a pipeline, an inert anode typically made of some form of metallic alloy, graphite, or mixed metal alloy, and a reference coupon. The invention is designed to attach to a pipeline appurtenance such as an air release valve with an attached ball valve. Attaching the invention to a pipeline appurtenance, such as an air release valve with an attached ball valve, is advantageous because it allows for non-invasive installation without the need to drain or decompress the pipeline, thereby minimizing operational disruptions and maintaining continuous pipeline operation. The turbine is suspended in the pipeline during operation to harness the kinetic energy of the fluid and convert the energy into direct current (DC) electrical power for the ICCP system through the use of a DC generator.

In some embodiments, the turbine blades can be designed to any size to accommodate the diameter of the pipeline. In yet other embodiments, the turbine blades may be adjustable in size. The blades are configured to rotate due to the force of the fluid passing through the pipeline which is variable but typically in the range of 2 to 6 ft/s. The rotating blades in turn rotate the DC generator generating DC power up to 15 kW. The reference coupon of the ICCP system is used to measure the electronegativity of the soil surrounding the pipeline, which determines the voltage and current needed to cathodically protect the metallic pipeline. The current requirement for cathodic protection is very low, commonly on the order of 2 mA. Hence, stepper diodes are used to reduce the current coming out of the DC generator and going into the pipeline cathode, which helps prevent embrittlement of the pipeline. An individual installation of the invention on a pipeline is sufficient to cathodically protect up to ten miles of pipeline. This value depends on pipe diameter, number of turbine blades and the difference in electrical potential between the surrounding soil and the pipeline.

Figure 1:
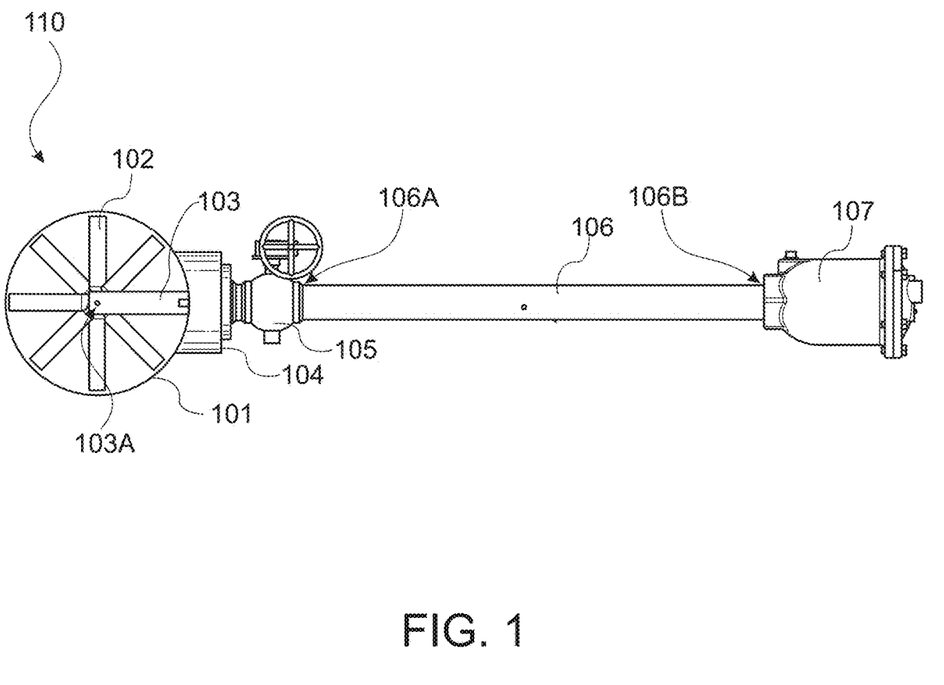
FIG. 1 is a side view of a turbine-induced ICCP system for metallic pipelines according to an embodiment of the present invention.

The invention can be better appreciated with reference to FIG. 1, which shows the turbine-induced ICCP system in an operative state. An existing metallic pipeline 101 is in need of cathodic protection from corrosion. In some embodiments, on a first end of the turbine 110, a number of turbine blades 102 are suspended within the pipeline 101. Advantageously, the turbine blades 102 spin under the force of the fluid moving through the pipeline. In one embodiment, the turbine blades 102 are attached to a retractable turbine bracket 103 at one end 103A of the turbine bracket 103. In one embodiment, the turbine bracket 103 extends away from the turbine blades 102 passing through an existing pipeline tee 104 and an existing ball valve 105, which are used to provide access to the pipeline for the turbine. It should be understood that this is only one example of a pipeline appurtenance that can be used to provide access to the pipeline for the invention and one skilled in the art will recognize that there are other types of pipeline appurtenances that could be used and accommodated for.

Figure 4:
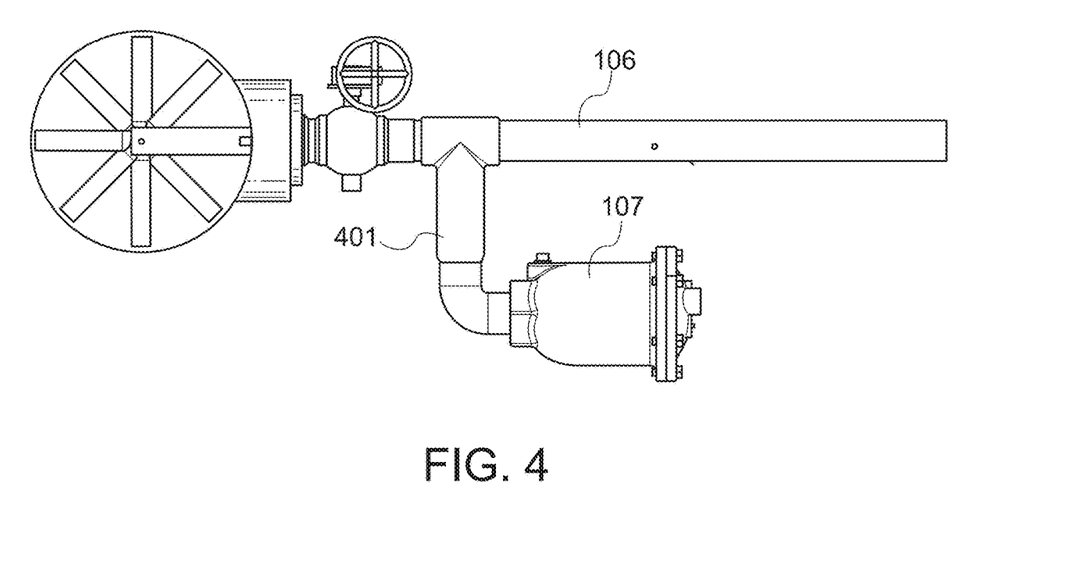
FIG. 4 is a side view of a turbine-induced ICCP system for metallic pipelines with an air-release valve re-mounted onto an offset tee according to an embodiment of the present invention.

In some embodiments, the invention includes an enclosure tube 106 which is removably attached on one end 106A to the existing ball valve 105 on the end of the ball valve opposite to the end connecting to the existing pipeline tee 104. On the other end of the enclosure tube 106B, an existing air release valve 107 may be removably attached in this example of a pipeline appurtenance. In one embodiment, the connections between the enclosure tube 106 and the existing pipeline appurtenance components (here 105, 107) are threaded screw fittings, but any type of removable attachment elements may be used. In the case of limited vertical clearance around the pipeline appurtenance, in some embodiments, the existing air-release valve 107 may be moved to the side of the enclosure tube 106 using an offset tee 401, as shown in FIG. 4.

Figure 2:
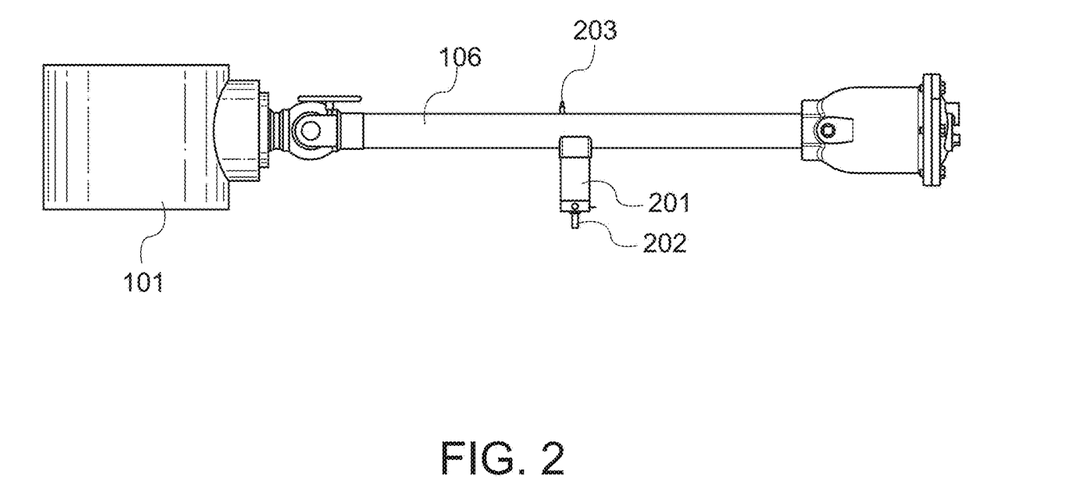
FIG. 2 is an alternate side perspective view of a turbine-induced ICCP system for metallic pipelines according to an embodiment of the present invention.
Figure 3:
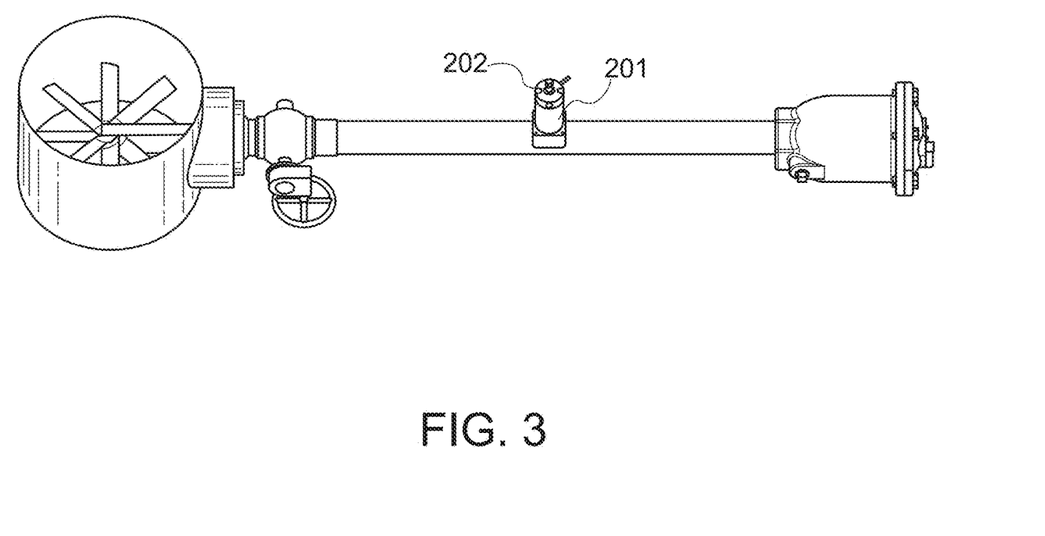
FIG. 3 is a side perspective view of a turbine-induced ICCP system for metallic pipelines according to an embodiment of the present invention.

Now referring to FIG. 2, the rotation of the turbine blades powers a DC generator 201, which is removably attached to and extends out of the side of the enclosure tube 106. In one embodiment, a manual blade alignment axle 202 extends out of the end of the DC generator 201 opposite to the end of the DC generator 201 which is attached to the enclosure tube 106. In one embodiment, the DC generator 201 is located on the outside of the enclosure tube 106 which has the advantage of enabling easy access to the DC generator 201 for repair or replacement. The manual blade alignment axle 202 can be manually turned to align the turbine blades 102 into the correct position for retracting them out of the pipeline 101 and up into the enclosure tube 106. A manual retraction axle 203 also extends out of the side of the enclosure tube 106 and can be rotated in order to achieve retraction of the turbine blades 102. The procedure for extending and retracting the turbine blades 102 is described below in more detail.

Figure 5:
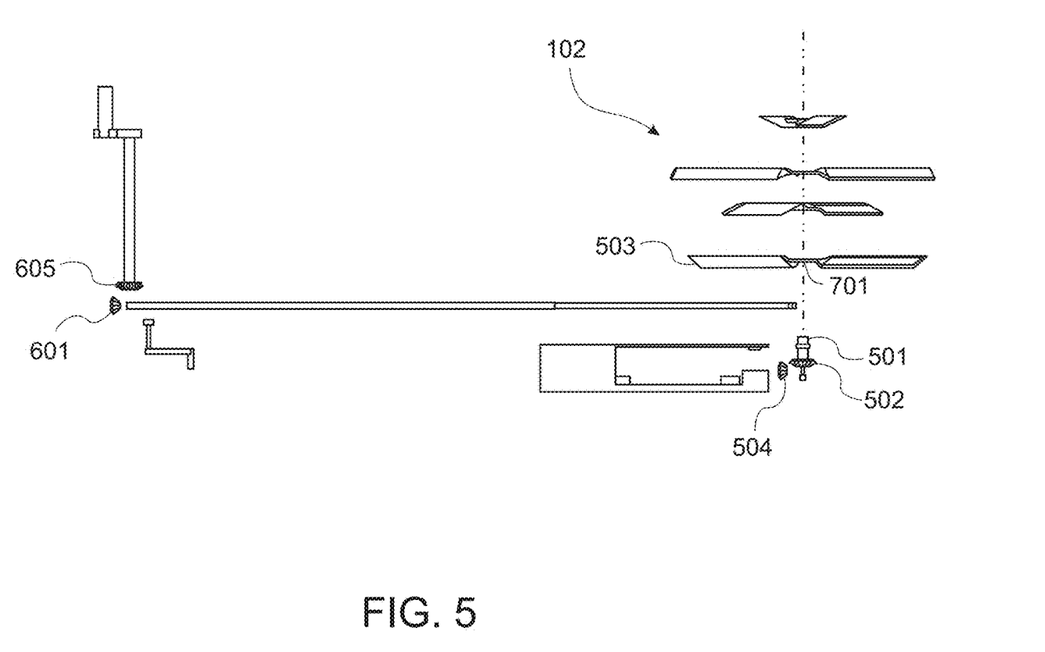
FIG. 5 is a side exploded view of a turbine-induced ICCP system for metallic pipelines according to an embodiment of the present invention.

Referring now to FIG. 5, an exploded side view of the turbine blades apparatus is shown. In one embodiment, the turbine blades 102 have a center hole 701 (best seen in FIGS. 7A-B) which allows them to fit onto the turbine blade axle 501. The turbine blade axle 501 is connected at its bottom end to a turbine blade bevel gear 502.

Figure 6A:
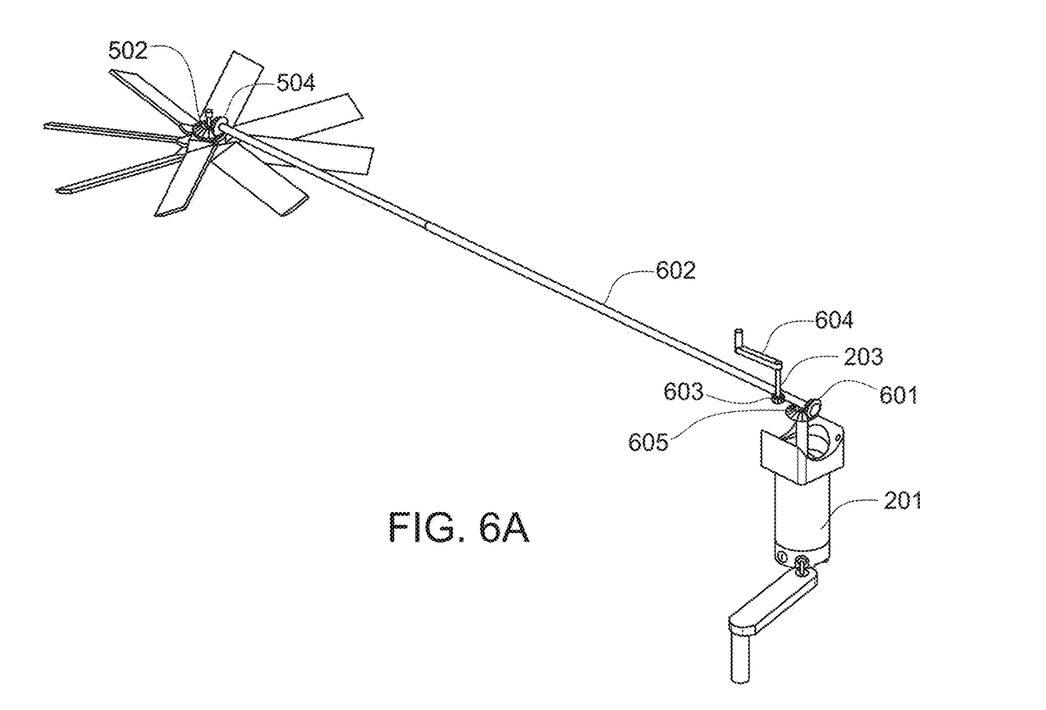
FIG. 6A is a side perspective view of some of the gears and axles inside of a turbine-induced ICCP system for metallic pipelines according to an embodiment of the present invention.
Figure 6B:
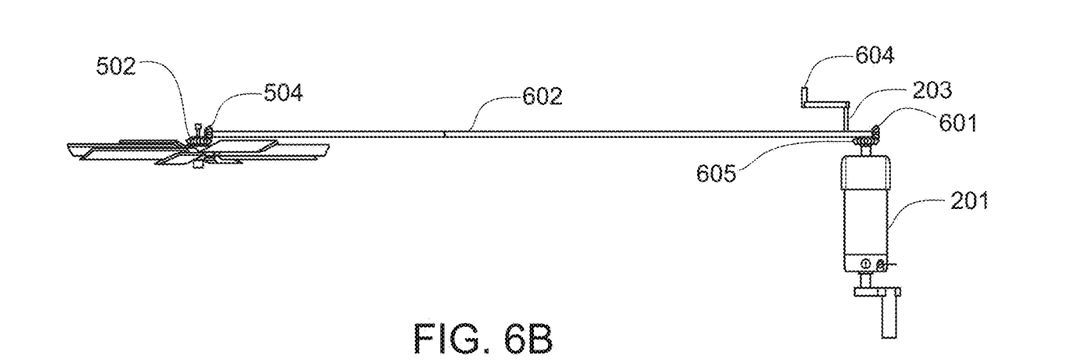
FIG. 6B is a side view of FIG. 6A.

Referring now to FIGS. 6A-B, the gear and axle apparatus of the invention is shown. The turbine blade bevel gear 502 is connected to a main axle bevel gear 504 so that when either rotates, the other does as well. The main axle bevel gear 504 is connected to a main axle 602 at one end of the main axle 602. The main axle runs from the main axle bevel gear 504 to the DC generator 201. In one embodiment, the fluid-flow in the pipeline rotates the turbine blades 102, which in turn rotate the turbine blade bevel gear 502, which in turn rotates the main axle bevel gear 504 and the main axle 602, which in turn rotates the secondary bevel gear 601, which rotates the DC generator 201 via the DC generator bevel gear 605 to produce electricity to power the ICCP system.

Also in FIGS. 6A-B, the manual retraction axle 203 is shown, wherein the manual retraction axle 203 is connected on its bottom end to a manual retraction gear 603. The manual retraction gear 603 is connected to the main axle 602. The main axle includes gear threads (not illustrated) which make the connection with the manual retraction gear 603. The manual retraction axle 203 is removably attached on its top end to a manual retraction crank handle 604. Cranking the manual retraction crank handle 604 rotates the manual retraction axle 203 and manual retraction gear 603 which in turn, depending on the direction of the cranking, either pulls the main axle 602 out of the pipeline, or pushes the main axle 602 into the pipeline.

Figure 7A:
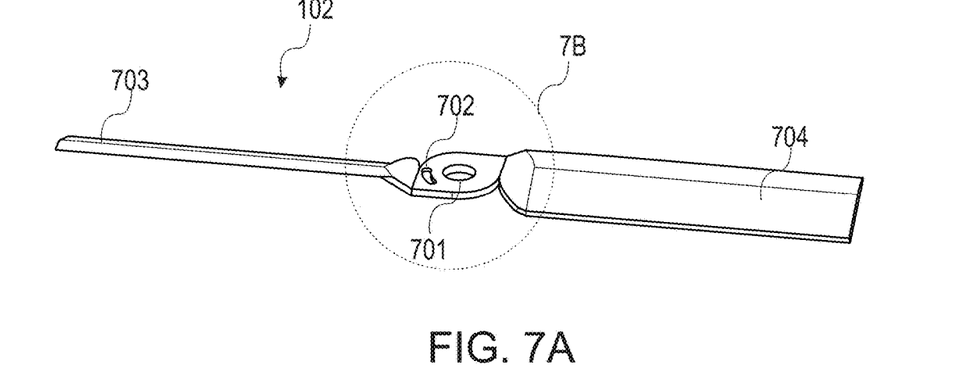
FIG. 7A is a top perspective view of a turbine blade of a turbine-induced ICCP system for metallic pipelines according to an embodiment of the present invention.
Figure 7B:
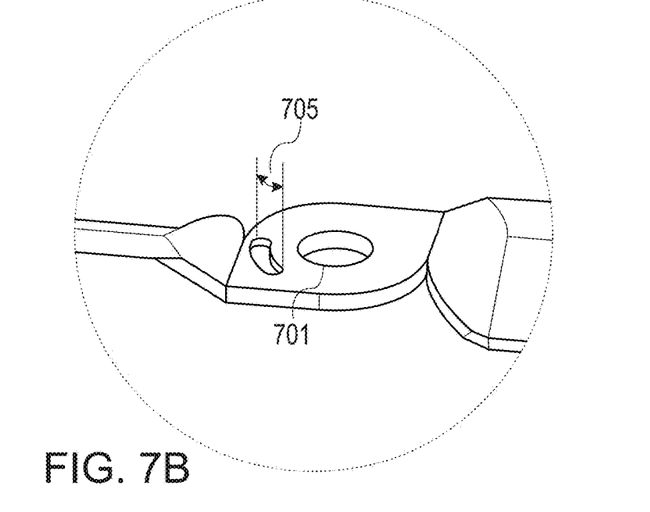
FIG. 7B is a detailed view of FIG. 7B.
Figure 8:
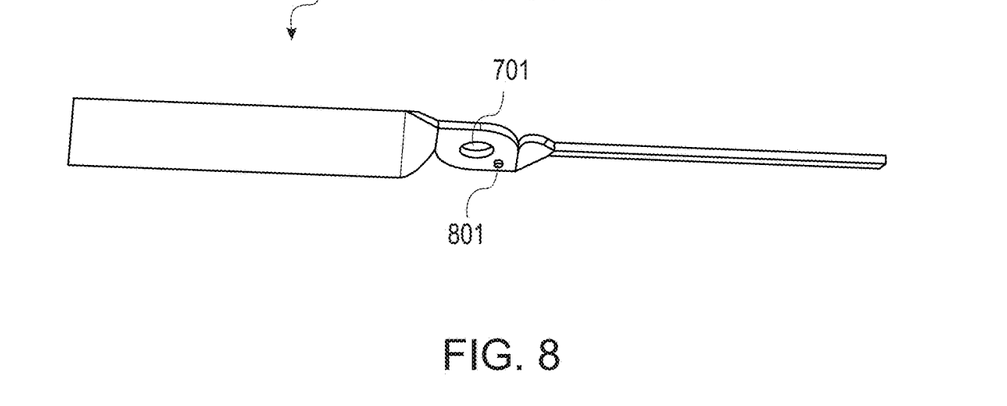
FIG. 8 is a bottom perspective view of a turbine blade of a turbine-induced ICCP system for metallic pipelines according to an embodiment of the present invention.

Referring now to FIGS. 7A-8, the turbine blades 102 include a center hole 701 through which the turbine blade axle (501; FIG. 5) fits. Each turbine blade 102 has a pin 801 and a divot 702, wherein a pin 801 of a first turbine blade fits into a divot 702 of a second turbine blade directly above it. The turbine blades 102 stack on top of each other in this manner, and the turbine blades 102 have some free movement in relation to each other as a result of the divot 702 having a defined angular distance 705, which is a critical feature for the procedure of expanding and retracting the turbine blades 102. The angular distance of the divot 702 varies depending on the desired number of turbine blades 102. For a four blade system as shown in FIG. 5, the angular distance is 45 degrees (best seen in FIG. 7B). The turbine blades 102 includes a first blade segment 703 and a second blade segment 704 which extend outward in opposite directions from the center hole 701. These blade segments (703, 704) of the turbine blades 102 are angled in such a manner that the perpendicular force of the fluid-flow in the pipeline forces the turbine blades 102 to spin around the center hole 701.

Referring now to any of the accompanying FIGS. 1-8, the procedure for expanding the turbine blades 102 into the pipeline 101 is described. In some embodiments, the turbine blades 102 begin in an aligned position so that each blade is oriented in parallel with each other and on top of each other, within the enclosure tube 106. The manual retraction crank handle 604 is turned by an operator to extend the main axle 602 towards the pipeline. Once the turbine blades 102 are fully inside the pipeline, the operator stops turning the manual retraction crank handle. The influence of the fluid flow on the blade segments (703, 704) of the turbine blades 102 pushes the turbine blades 102 apart until the pin 801 of a lower turbine blade contacts the edge of the divot 702 of an upper turbine blade, for each turbine blade. The turbine blades 102 are now fully open and will remain in that position under the influence of the fluid-flow in the pipeline.

Now, an example procedure for retracting the turbine blades 102 is described. The bottom turbine blade 503 is slightly longer than the other turbine blades. The operator turns the manual blade alignment axle 202 until the bottom turbine blade 503 is lined up in parallel with the enclosure tube 106. In one embodiment, this alignment of the bottom turbine blade 503 and the enclosure tube 106 is accomplished by aid of a shaft encoder which indicates the angular position of the bottom turbine blade 503. The operator then turns the manual retraction crank handle 604 just enough to pull an end of the bottom turbine blade just outside of the pipeline 101 and into the existing pipeline tee 104. The operator then turns the manual blade alignment axle 202 which rotates the turbine blades 102 against the influence of the fluid-flow in the pipeline. As the bottom turbine blade 503 is held in place against the side of the existing pipeline tee 104, the other turbine blades move in relation to it as each turbine blade pin 801 slides to the opposite end of the turbine blade divot 702 of the turbine blade directly above it. This forces all turbine blades 102 to align in parallel on top of each other and in parallel with the enclosure tube 106. The operator then turns the manual retraction crank handle 604 to pull the turbine blades out of the pipeline 101 and into a fully retracted position within the enclosure tube 106.

It is understood that various modifications, adaptations, and alternative methods for retracting the turbine blades may be utilized without departing from the scope and spirit of the present invention. For instance, automated mechanisms, different alignment techniques, or alternative blade configurations may be employed to achieve similar results. Likewise, in some embodiments, the extension and retraction of the turbine blades may be achieved automatically by including battery energy storage within the device, using the DC generator to charge the battery, and using the battery to power the rotation of the manual blade alignment axle as well as the rotation of the manual retraction axle.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A turbine for powering an impressed current cathodic protection system for a metallic pipeline, comprising:
    a plurality of turbine blades configured to extend into the pipeline and to rotate under the influence of fluid flow within the pipeline;
    a turbine blade bracket configured to support and receive the plurality of turbine blades, the turbine blade bracket extending through a pipeline appurtenance, allowing installation of the plurality of turbine blades and the turbine blade bracket without draining or decompressing the pipeline;
    an enclosure tube removably attached to the pipeline appurtenance, the enclosure tube fitting around the turbine blade bracket and facilitating installation and maintenance of the plurality of turbine blades; and
    a DC generator coupled to the plurality of turbine blades, configured to convert kinetic energy from the plurality of turbine blades into direct current electrical power sufficient to cathodically protect the pipeline.

2. The turbine of claim 1, wherein the turbine blades are sized to accommodate varying diameters of the pipeline.

3. The turbine of claim 1, wherein the DC generator is capable of generating up to 15 kW of direct current electrical power.

4. The turbine of claim 1, further comprising a stepper diode configured to modulate the current output from the DC generator to a level that prevents embrittlement of the pipeline while providing adequate cathodic protection.

5. The turbine of claim 1, wherein the enclosure tube includes a removable attachment element for connecting to the pipeline appurtenance, facilitating maintenance.

6. The turbine of claim 1, wherein the pipeline appurtenance includes an air release valve and a ball valve, which allow installation of the turbine without requiring the pipeline to be drained or decompressed.

7. The turbine of claim 1, wherein the turbine blade bracket extends away from the turbine blades and passes through a pipeline tee and a ball valve to provide access to the turbine.

8. The turbine of claim 1, further including a reference coupon configured to measure the electronegativity of the soil surrounding the pipeline to determine the required voltage and current for cathodic protection.

9. The turbine of claim 1, wherein the DC generator is located on the outside of the enclosure tube to enable easy replacement or repair of the DC generator.

10. The turbine of claim 1, wherein the turbine blades each have a pin on their top-side and divot on their bottom-side, and the pin on a turbine blade fits into the divot on the turbine blade directly above it, and the pin-divot connection between the two turbine blades allows a certain angular distance of free movement between the two connected turbine blades.

11. The turbine of claim 1, wherein the turbine blades can be extended into or retracted from the pipeline using a manual crank handle to manipulate the position of a main axle, and by extension, the position of the turbine blades.

12. The turbine of claim 1, further comprising a manual blade alignment axle and a manual retraction axle, configured to align and retract the turbine blades for removal from the pipeline.

* * * * *